United States Patent [19]
Dickinson et al.

[11] Patent Number: 4,994,639
[45] Date of Patent: Feb. 19, 1991

[54] METHODS OF MANUFACTURE AND SURFACE TREATMENT USING LASER RADIATION

[75] Inventors: Peter H. Dickinson; Geoffrey M. Proudley, both of Filton, United Kingdom

[73] Assignee: British Aerospace Public Limited Company, London, England

[21] Appl. No.: 463,683

[22] Filed: Jan. 11, 1990

[30] Foreign Application Priority Data

Jan. 11, 1989 [GB] United Kingdom ............... 8900550.8

[51] Int. Cl.$^5$ .................................................. B23K 26/00
[52] U.S. Cl. ............................. 219/121.69; 219/121.68
[58] Field of Search ................... 219/121.68, 121.69, 219/121.6, 121.85; 156/643; 427/270, 271; 244/130

[56] References Cited

U.S. PATENT DOCUMENTS 4,414,059 11/1983 Blum et al. .................. 219/121.72 X
4,500,771 2/1985 Miller .............................. 219/121.68
4,588,885 5/1986 Lovoi et al. ................ 219/121.62 X
4,874,920 10/1989 Yamazaki et al. ......... 219/121.75 X

FOREIGN PATENT DOCUMENTS 1078000 8/1967 United Kingdom .
1321743 6/1973 United Kingdom .
1400860 7/1975 United Kingdom .
1441745 7/1976 United Kingdom .
1545933 5/1979 United Kingdom .
2007561 5/1979 United Kingdom .

Primary Examiner—C. L. Albritton
Attorney, Agent, or Firm—Young & Thompson

[57] ABSTRACT

An excimer laser is used to ablate the surface of an article to provide it with a drag-reduction pattern (e.g. a series of riblets). The article may be a painted article and the drag reduction pattern may be formed in the paint layer. A method is also disclosed in which paint is removed from a painted article using an excimer laser, as a prepatory step for repainting the article.

11 Claims, 2 Drawing Sheets

METHODS OF MANUFACTURE AND SURFACE TREATMENT USING LASER RADIATION

This invention relates to methods of manufacture and surface treatment which use laser radiation and in particular, though not exclusively, to such methods which use ultraviolet laser radiation. In one aspect, the invention relates to the manufacture of articles having low drag associated therewith. The invention also extends to the treatment of surface layers of articles, for example the stripping of paint from a painted article.

Recent studies have shown that the fluid dynamic drag of a surface may be reduced if the surface is corrugated to provide it with a series of elongate riblets aligned with the local direction of flow. This is seen to be a promising method of achieving drag reduction; values of 2 to 4% are quoted in M.J. Walsh "Riblets as a viscous drag reduction technique". (AIAA Journal, 21, 2, 1983 pp 485–486). A reduction of a few percent in the drag associated with an aircraft leads to a large reduction in the amount of fuel required to propel the aircraft with a consequent significant reduction in operating costs.

However, in practice there can be difficulties in European Published patent application No. 205,289 discloses a drag reduction sheet which is applied and bonded to the surface on which drag is to be reduced. The sheet is formed either by extrusion or by embossing techniques to carry on its upper surface a patterned surface to provide a riblet or similar structure. As mentioned, it is necessary to align the riblets with the local flow direction of the local boundary layer. The flow distribution of the boundary layer across a complex, double curvatured surface such as the wing of an aircraft is non-parallel and varies significantly across the surface. Thus, if embossed or extruded sheets are used as suggested by a European Published patent application No. 205289, many different sheets of varying configuration may be required and there may well be difficulty in ensuring that the boundaries between adjacent sheets do not give rise to increased drag. Also, the use of sheets, together with the adhesive necessary to bond the sheets to the aircraft will of course incur a weight penalty.

U.S. Pat. No. 4,706,910 discloses a similar drag reduction system in which the pattern is formed by extruding vinyl tape.

U.S. Pat. No. 4,414,059 discloses a method of surface treatment using an excimer laser in which selected regions of a surface coating such as a mask of photoresist material on a substrate may be ablated to modify the geometry of the mask. U.S. Pat. No. 4,414,059 does not make any reference to use of an excimer laser to form drag reduction patterns nor does it refer to the possibility of removal of a coating from an article as a preliminary step in the recoating of the article. Furthermore, the U.S. Patent does not refer to use of the disclosed system in other than microlithographic processes for the formation of integrated circuits etc.

According to one aspect of this invention, there is provided a method of making an article having reduced drag, which method comprises irradiating the surface of said article with laser radiation to provide a pattern on said surface which reduces the drag associated with said surface.

According to another aspect of this invention, there is provided a method of treating an article having a surfacial layer, which method comprises irradiating said surficial layer with laser radiation to remove at least part of said layer and thereafter applying a further layer to said article.

According to another aspect of this invention, there is provided a method of preparing a painted article to receive a further layer of paint which method comprises irradiating said article with laser radiation to remove at least some of the paint therefrom.

The Applicants describe herein embodiments in which an article, for example an aircraft or other article which is immersed in a fluid, is formed to have a drag reduction pattern thereon by employing an ultraviolet laser to ablate selected surface portions of the article. In one specific embodiment, for use where the article is painted or carries a polymer coating, the method comprises removing selected portions of the paint or coating to provide a drag reduction pattern. In this way, possibly by using a robot or other similar preprogrammed machine, the article may be provided with the appropriate drag reduction pattern (e.g. riblets) configured in accordance with the surface contour and directions of local boundary layer flow of the aircraft. Thus, compared to the previously disclosed arrangements the disclosed method may make it easier to align the riblet structure with the local boundary airflow. Also the problems of possible increases in drag due to edge effects of the sheets and the problem of the weight penalty incurred by the sheets and their adhesive may be reduced.

Non-limiting examples of the invention will now be described in detail, reference being made to the accompanying drawings, in which.

Figure 1:
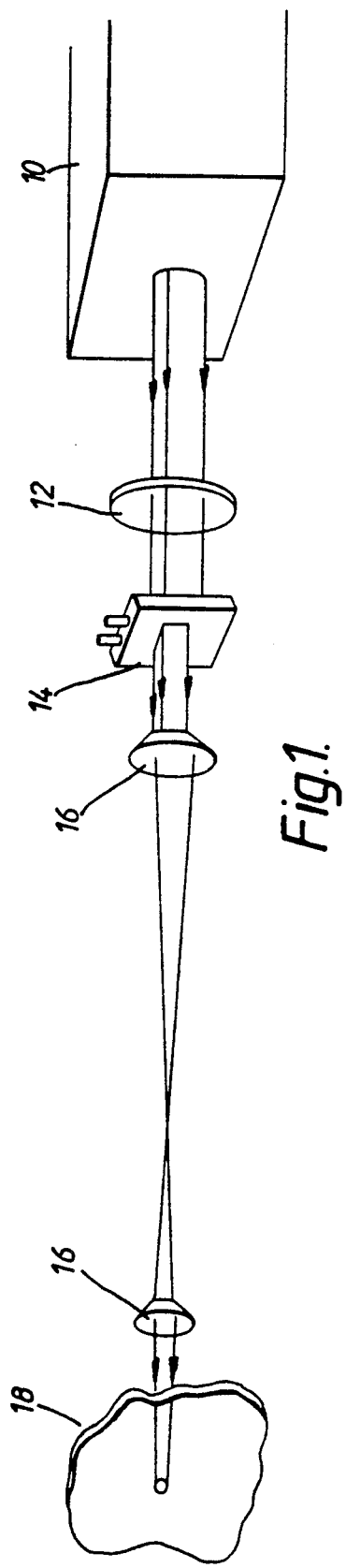
FIG. 1 is a schematic diagram illustrating a typical optical layout employed in embodiments of this invention.

Referring initially to FIG. 1, a typical example of optical layout for implementing the methods according to the invention comprises an excimer laser 10 which projects a pulsed ultraviolet laser beam via beam manipulating optics 12 to a mask 14 and thence via an imaging lens system 16 to the target 18. The beam handling optics 12 optimises the beam profile incident on the mask 14. The mask 14 defines the pattern of the ultraviolet laser radiation which is incident on the target 18. The system illustrated in FIG. 1 forms the basis of the systems used in the methods to be described below, but modifications may be necessary for particular applications. In most systems it will be necessary to provide position sensors, to ensure that the mask 14 is correctly imaged onto the surface of the target. The position sensors may be sensors such as touch-sensitive sensors, non-contact optical, or acoustic or other sensors. For most practical applications the laser 10 will be remote from the target surface and some form of laser beam transmission arrangement will be used to direct the laser beam from the laser 10 to the target 18. For example an articulated arm may direct the beam to the target by a series of mirrors. A further possibility is that a fibre optic system may be developed to deliver the laser beam to the target.

The laser 10 may typically be a KrF laser which has an output wavelength of about b 249 nm. Currently available excimer lasers have power outputs of up to 200 W, although more powerful lasers are available to provide added benefit.

Figure 2:
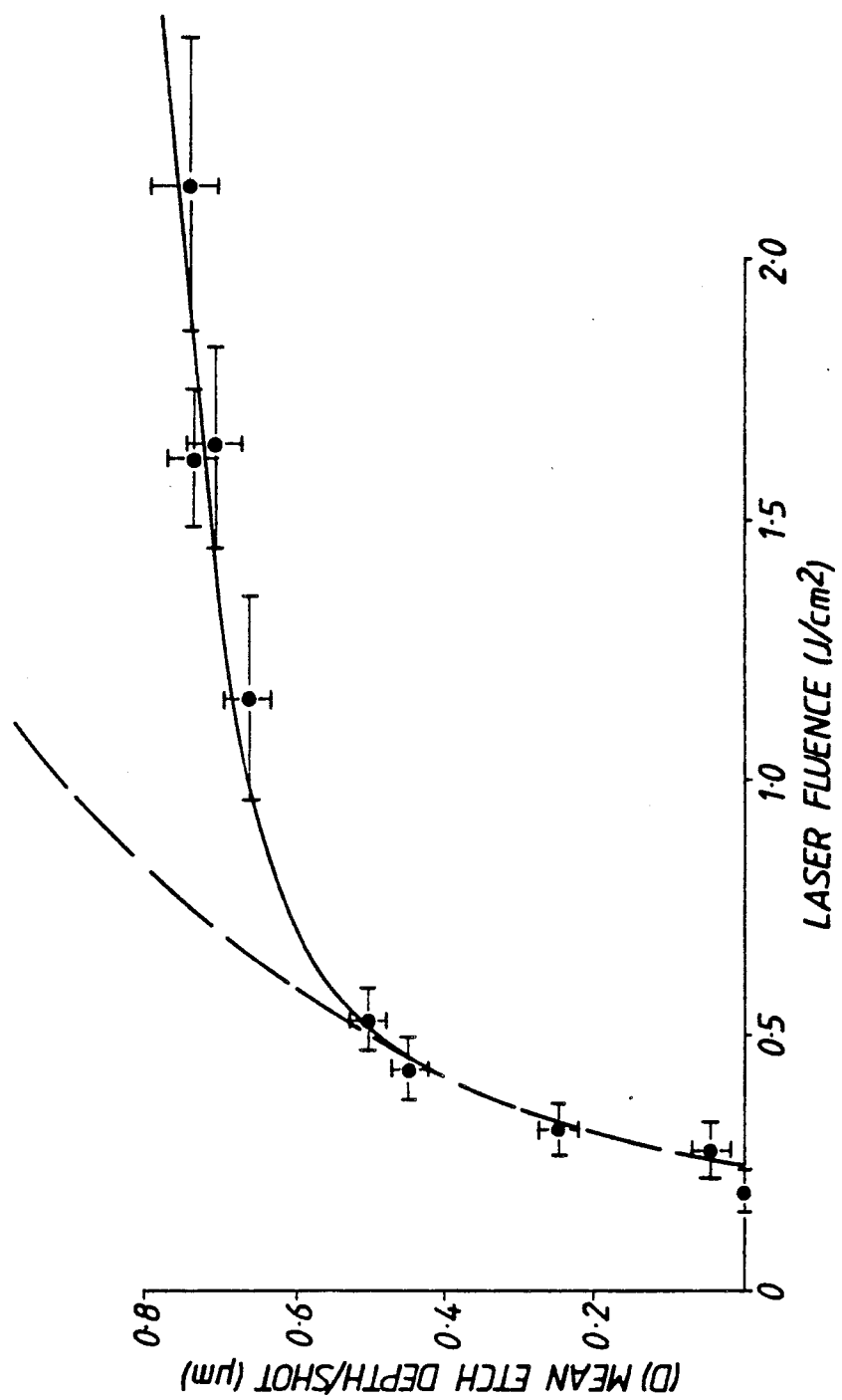
FIG. 2 is a graph illustrating a typical mean etch depth/shot versus excimer laser fluence for a typical excimer laser and for a particular paint sample.

There now follow the results of a study conducted by the Applicants into the laser machining of riblets in painted surfaces. Excimer laser etching of paint was investigated at two wavelengths: 249 nm and 308 nm. The removal rates are higher at 249 nm. At low fluence (optical energy density - J cm$^{-2}$) it is found that removal rates are well described by a Beer's law relationship:

$$D = C_1 ln(F/C_2)$$

here D=etch depth/pulse ($\mu$m)
F=laser fluence (J cm$^{-2}$)
$C_1$ and $C_2$ are constants Studies were carried out on white polyurethane gloss paint and on grey matt paint. Removal rates are highest for the white polyurethane paint. It is possible that paint formulations could be modified to make them more suitable for laser processing. In the case of the white paint (ICI Polyurethane F210-0731, Thinner 851-808) values of 0.7 and 0.24 are obtained for $C_1$ and $C_2$ respectively. Referring to FIG. 2, the experimental and theoretical (Beer's law relationship) values for mean etch depth/shot for the white paint on an aluminum substrate are plotted against laser fluence The experimental curve is solid and the theoretical curve is dashed. A threshold for removal of this paint was found to be 0.24 J cm$^{-2}$. The Beer's law relationship holds good up to 0.5 J cm$^{-2}$, above which it was found to roll over. For optimum efficiency it is necessary to operate in the Beers law region of the curve.

Figure 3:
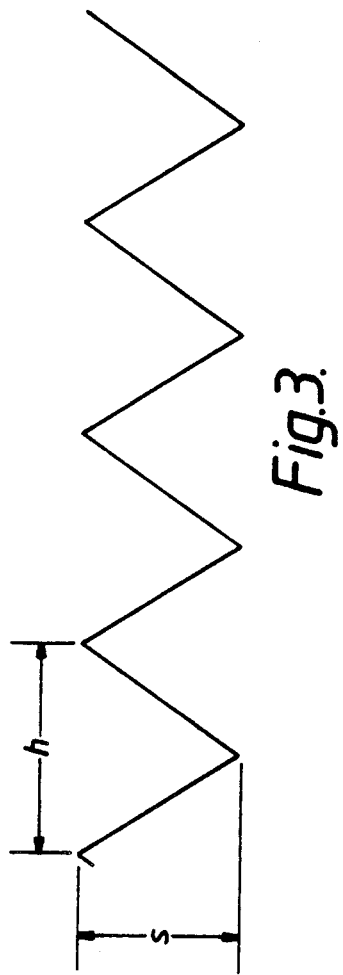
FIG. 3 is a cross section of a typical riblet profile for reducing the surface drag of the article.

Referring now to FIG. 3, there is shown an example of a profile for a riblet structure for reducing the drag of a "wetted" surface such as the exposed surface of an aircraft, the surfaces of vanes, propellers, the surface of a boat or the internal surface of a pipe etc. The riblet structure comprises adjacent generally V-shaped grooves each of which is aligned with the local vector of the boundary airflow. Minimum values for s and h (see FIG. 3) have been suggested as 0.071 mm and 0.051 mm respectively. A rounded valley floor would produce better results, and would probably be easier to machine.

The typical surface area of a commercial passenger aircraft is 300–400 m$^2$. On the basis of the data in FIG. 2, a simple first order analysis indicates that a high power laser of the order of 0.5 Kw output could be used to machine a riblet structure as shown in FIG. 3, over the entire fuselage of an aircraft in a period of the order of 50 to 100 hours.

The apparatus illustrated in FIG. 1 may be used to implement two methods, namely riblet manufacture or large area removal of paint or polymer coating. In that first method, the mask 14 consists of an aperture with a series of parallel bars running across it. The system generally illustrated in FIG. 1 is set up to machine the surface of the article, such as an aircraft, which is to be provided with riblets. In this method, small amounts of the surface of the article are ablated by the ultraviolet laser radiation. In the present example, it is assumed that the article has a painted surface and the paint material is ablated. In other applications, however, it may be possible to ablate surface layers from metal or ceramics etc. Imaging of the mask onto the painted surface will result in the incident ultraviolet radiation machining a series of parallel grooves, to provide a drag-reducing riblet structure of the type shown in FIG. 3. It is preferred for the peaks of the grooves to be pointed, but in some instances there may be a small flat section between the grooves where the bars on the mask are imaged. However, the dimensions of the flats could be minimized to say, 5% of the groove width. In some applications the formulation of the paint may be modified to enhance the formation of appropriately shaped grooves.

As mentioned above, the laser beam may be moved by a programmed manipulator to machine the riblet structure. This technique could be used in conjunction with, or instead of, the mask 14 but is at present non-preferred. Scanning may also be used to machine the grooves. In the second method, the apparatus of FIG. 1 may be used to strip paint or polymer coating from a painted or coated article, such as an aircraft, as a preliminary treatment prior to repainting of the article. In this instance the mask 14 is not necessary although a rectangular apertured mask may be used to delimit the periphery of the incident beam on the painted article.

As with the previous method, the laser 10 is operated to ablate a layer of precisely controllable thickness. A particular advantage of this method is that where an article has several superimposed layers of paint, the method assists removal of the paint layers in a very controlled fashion thus allowing removal of only the topcoat to leave the undercoat exposed ready for re-painting. This method may have considerable time and cost savings compared to stripping down to bare metal. Additionally, the laser process may be particularly useful for stripping paint from composite materials which are becoming more widely used on aircraft, where chemical stripping may be unacceptable because it may damage the underlying composite materials.

Whilst the examples of method described above have used laser radiation in the ultraviolet waveband, laser radiation outside this waveband may be used instead.

We claim:

1. A method of treating a surface to reduce the drag associated therewith, the surface including at least a layer of polymer material, said method comprising irradiating said surface with laser radiation in the ultraviolet waveband to provide a drag-reduction pattern therein.

2. A method according to claim 1, wherein said pattern comprises a series of elongate grooves which defines a series of elongate riblets on said surface.

3. A method according to claim 2, wherein each of said grooves includes two side walls which converge toward the base of the groove.

4. A method according to claim 3, wherein each of said grooves is of generally V-section.

5. A method according to claim 1, wherein the step of irradiating the surface includes passing laser radiation through imaging means, for example mask means, which defines at least part of said pattern.

6. A method of treating an article having a polymeric surfacial layer, which method comprises irradiating said surfacial layer with laser radiation in the ultra-violet waveband to remove at least part of said layer and thereafter applying a further layer to said article.

7. A method according to claim 6, wherein said further layer is a coating for example of paint or other polymer material.

8. A method of preparing a painted article to receive a further layer of paint which method comprises irradiating said article with laser radiation in the ultraviolet waveband to remove at least some of the paint therefrom.

9. A surface treated in accordance with claim 1.

10. An article treated in accordance with claim 6.

11. A painted article prepared in accordance with claim 8.

* * * * *